Oct. 30, 1934.  S. F. BRIGGS  1,978,856
FILTER
Filed May 8, 1933
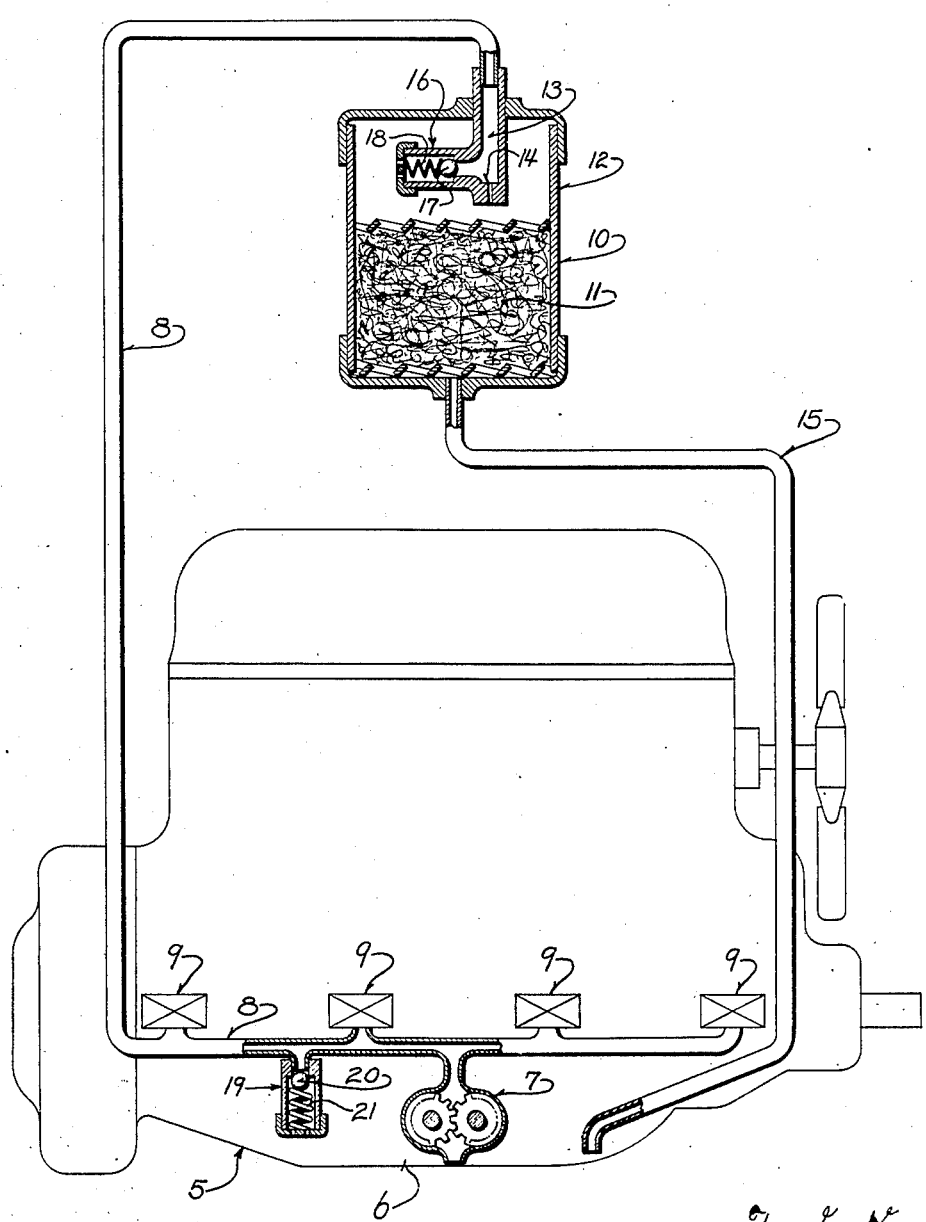
Inventor
Stephen F. Briggs
By Ira Milton Jones
Attorney Patented Oct. 30, 1934

1,978,856

UNITED STATES PATENT OFFICE 1,978,856

FILTER

Stephen F. Briggs, Chenequa, Wis., assignor to Briggs & Stratton Corporation, Milwaukee, Wis., a corporation of Delaware Application May 8, 1933, Serial No. 669,829

6 Claims. (Cl. 210—131)

This invention relates to certain new and useful improvements in filter systems and refers more particularly to the particular manner of connecting a filter unit in the lubricating system of an automotive vehicle engine.

It is an object of this invention to increase the volume of oil which passes through the filter unit in a lubricating system of an engine within a given time.

Another object of this invention is to provide means whereby upon an increase in oil pressure in the lubricating system by reason of increasing engine speeds, an additional inlet passage to the filter is opened so that a greater volume of oil is conducted to and forced through the filter unit during such higher engine speeds.

And a further object of this invention is to generally improve the lubricating system of engines and the like by removing dirt and extraneous matter from the oil in less time than has heretofore been possible.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing, I have illustrated one complete example of the physical embodiment of my invention constructed according to the best mode I have so far devised for the practical application of the principles thereof, and in which:

The single figure is a diagrammatic view illustrating the application of this invention to a conventional automotive vehicle engine.

Referring now more particularly to the accompanying drawing, the numeral 5 designates generally an automotive engine of any type equipped with the usual crank case 6 which contains a quantity of oil or other fluid lubricant as is customary.

The oil from the crank case is forced by means of a pump 7 driven from the engine, into a circulating system illustrated as a duct 8 leading to the various bearings diagrammatically illustrated as at 9, and also to an oil filter unit 10. The filter unit 10 may be of any desired design and is shown as comprising a mass of fibrous material 11 disposed within a container 12. The duct 8 communicates with the interior of the container 12 above the mass of fibrous material through a fitting 13 provided with a restricted opening 14 leading directly into the interior of the container.

The oil pumped into the duct 8 thus enters the filter unit through the restricted opening 14, and after passing through the fibrous material to have all foreign matter removed therefrom, it is conducted through a duct 15 back into the crank case.

During slow engine speeds, the volume of oil pumped into the system is such that the required amount is forced to the various bearings and the remainder to the filter unit. Upon an increase in engine speed, however, the volume of oil delivered to the circulating system by the pump increases and as it is undesirable to conduct more than a predetermined quantity to the bearings it has heretofore been customary to by-pass the oil back into the crank case, whenever the pressure in the system exceeded a predetermined maximum. Only a very small percentage of the oil was passed through the filter unit regardless of the quantity being pumped.

By this invention, the excess oil pumped into the system during higher engine speeds, instead of being by-passed back into the crank case as heretofore, is passed through the filter unit. To this end, the fitting 13 is provided with a relief valve indicated generally by the numeral 16 and comprising a ball 17 normally held closed by a spring 18, which upon an increase in pressure within the circulating system by virtue of an increased engine speed, opens and thus increases the inlet opening into the filter unit. Consequently, the oil of the system is forced through the filter unit more rapidly and the extraneous matter is removed from the oil in considerably less time than has heretofore been possible.

The above described action continues until the filter unit becomes clogged whereupon a second relief valve 19 opens to by-pass the oil from the circulating system directly into the crank case. The relief valve 19 may be of the same construction as the valve 16 and has a ball member 20 yieldably held closed by a spring 21. The spring 21, however, is stronger than the spring 18 of the valve 16 so that the relief valve 19 does not open until the filter unit becomes clogged.

In the embodiment illustrated, the clean oil coming from the filter unit is conducted directly back into the crank case. In some instances it may be desirable to have the oil or at least a part thereof flowing from the filter unit, pass to some special bearing. In such case it is, of course, necessary to provide a by-pass relief valve around the filter unit to open after the filter unit became clogged and thus insure an uninterrupted flow of oil to the particular bearing.

From the foregoing description, it will be readily apparent to those skilled in the art to which this invention appertains, that by this invention the amount of oil passed through the filter unit of a lubricating system is automatically increased at higher engine speeds and that as a result dirt and other extraneous matter is removed from the oil in considerably less time than has heretofore been possible.

What I claim as my invention is:

1. In a fluid filtering system including a filter unit through which fluid is forced under pressure and means to place the fluid in the system under pressure, means to connect the filter unit with the system, said means having a fluid passage of fixed capacity leading directly to the filter unit to restrict the flow of fluid into the filter unit to a predetermined volume, and means operable upon an increase in fluid pressure within the system in excess of a predetermined maximum to afford an auxiliary fluid passage to the filter unit to increase the volume of fluid flowing into the filter unit.

2. In a forced feed lubricating system including fluid pressure producing means to force lubricant into said system, a filter unit, means having a fluid passage of fixed capacity to connect the filter unit with the system and through which lubricant flows to the filter unit under pressure, and means operable by an increase in fluid pressure within the system to increase the communication between the system and the filter unit so that upon such increase in pressure in the system a greater volume of lubricant is forced into the filter unit.

3. In a forced feed lubricating system for automotive vehicle engines and the like including fluid pressure producing means driven from the engine for forcing fluid into the system, a filter unit associated with the system to receive lubricant therefrom under pressure through a continually open restricted passage affording a fixed degree of communication between the system and the filter unit, said passage being such area to insure a requisite supply of lubricant to the various bearings of the engine at low engine speeds, and means operable by an increase in pressure within the system in response to increasing engine speeds to increase the degree of communication between the system and the filter unit whereby at higher engine speeds a greater volume of lubricant passes through the filter unit.

4. In a force feed lubricating system for automotive vehicle engines and the like having a reservoir to hold a supply of fluid lubricant, a pump driven from the engine for forcing lubricant from the supply into the system, a filter unit to receive lubricant under pressure from the system, through a constantly open passage affording a normal degree of communication between the filter unit and the system sufficient to insure a requisite flow of lubricant to all parts of the system while the engine is operating at low speeds, and a relief valve adapted to be opened by an increase in pressure within the system in response to higher engine speeds driving the pump at a greater speed to increase the communication between the system and the filter unit, whereby at higher engine speeds a greater volume of lubricant is forced through the filter unit.

5. In combination with an automotive vehicle engine having means to hold a supply of fluid lubricant, a lubricating system to convey lubricant under pressure to the various bearings of the engine and including a pump to force lubricant from said supply into the system, a filter unit connected with the system and through which lubricant is forced to be cleaned and returned to said supply, the communication between the lubricating system and the filter unit normally permitting but a predetermined volume of lubricant to flow into the filter unit, and means responsive to an increase in pressure within the system effected by an increase in engine speed driving the pump at a higher speed to increase the degree of communication between the system and the filter unit so that at higher engine speeds a greater volume of lubricant is forced through the filter unit.

6. In combination with an automotive vehicle engine having means to hold a supply of fluid lubricant, a lubricating system to convey lubricant under pressure to the various bearings of the engine and including a pump to force lubricant from said supply into the system, a filter unit connected with the system and through which lubricant is forced to be cleaned and returned to said supply, the communication between the lubricating system and the filter unit normally permitting but a predetermined volume of lubricant to flow into the filter unit, means responsive to an increase in pressure within the system effected by an increase in engine speed driving the pump at a higher speed to increase the degree of communication between the system and the filter unit so that at higher engine speeds a greater volume of lubricant is forced through the filter unit, and a relief valve to shunt the filter unit out of the circuit in the event said filter unit becomes clogged and passage of fluid therethrough is stopped.

STEPHEN F. BRIGGS.